July 10, 1956

C. E. BOLLS 2,753,654

HOLDER FOR TROT LINES AND STAGINGS THEREFOR

Filed July 12, 1952

*INVENTOR.*
CHARLES E. BOLLS
BY
M. Y. Charles
ATTORNEY.

July 10, 1956 C. E. BOLLS 2,753,654
HOLDER FOR TROT LINES AND STAGINGS THEREFOR
Filed July 12, 1952 2 Sheets-Sheet 2

INVENTOR.
CHARLES E. BOLLS
BY
M. Y. Charles
ATTORNEY.

United States Patent Office 2,753,654
Patented July 10, 1956

2,753,654

HOLDER FOR TROT LINES AND STAGINGS THEREFOR

Charles E. Bolls, Wichita, Kans.

Application July 12, 1952, Serial No. 298,540

3 Claims. (Cl. 43—57.5)

My invention relates to an improvement in holders for fishing trot lines and the staging therefor. An object of my invention is to provide a device of the kind mentioned on which a trot line may be wound and the staging for the trot line may be placed thereon and the staging may be stretched tightly first to dry and then to be held tightly and neatly for storage or until the trot line and staging are to be used again. A trot line and staging therefor taken care of in the manner just suggested will dry evenly and straight after being used and the lines will not rot or become weakened from not being properly taken care of.

Other objects will be made more apparent and will be more fully explained as this description progresses.

Now referring to the accompanying drawings in which similar numerals of reference designate the same parts throughout the several figures of the drawings.

Figure 1:
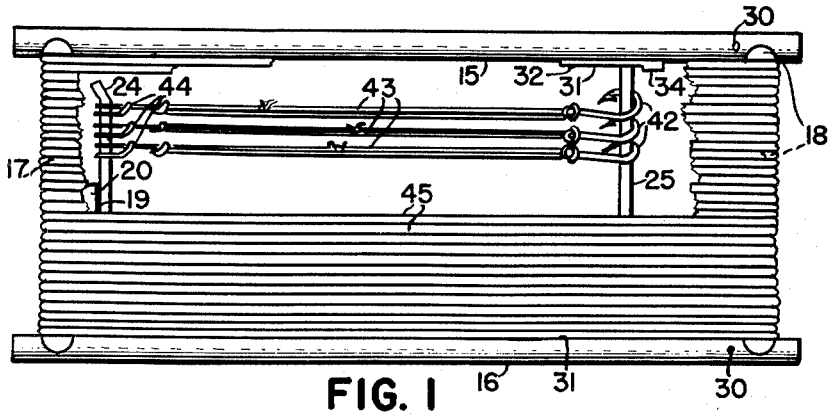
Fig. 1 is a front view of the holder device and illustrating how the trot line and staging therefor are placed and held on the holder device therefor, parts being broken away.
Figure 2:
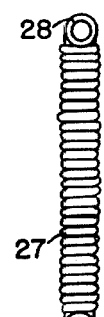
Fig. 2 is a detail side view of one of two duplicate helical springs that yieldably support the staging stretcher bar.
Figure 3:
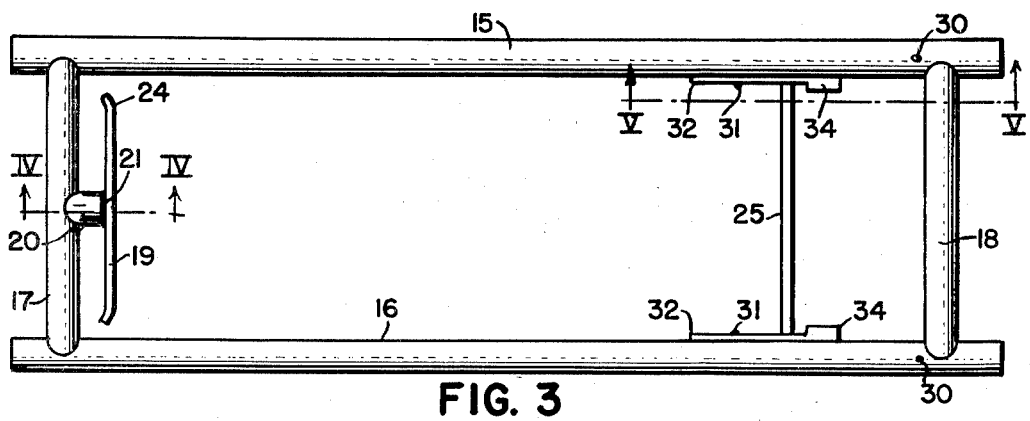
Fig. 3 is a front detail view of the trot line and staging holder, the trot line and staging being removed therefrom.
Figure 5:
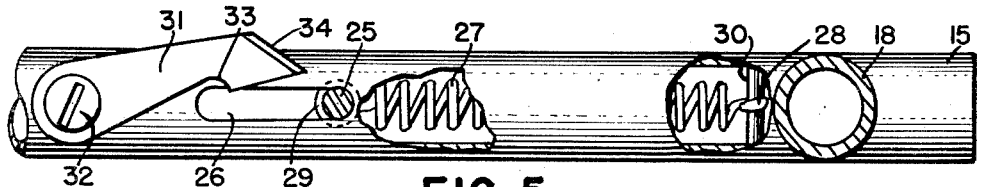
Fig. 5 is an enlarged detail sectional view through the trot line and staging holder device, on the line V—V in Fig. 3.
Figure 6:
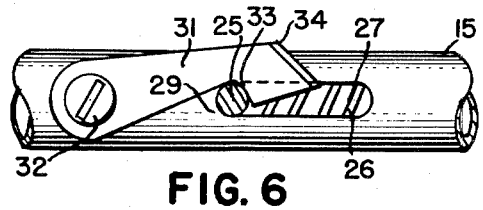
Fig. 6 is a view similar to Fig. 5 except that the staging bar is shown locked in its retracted position.
Figure 4:
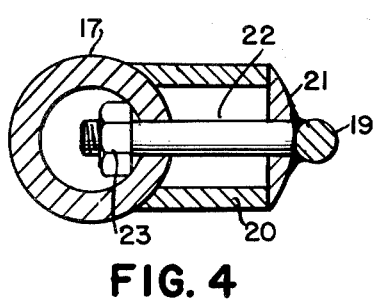
Fig. 4 is an enlarged detail sectional view through a portion of the device on the line IV—IV in Fig. 3 looking in the direction of the arrows.

In the drawings the device is shown as having a rectangular frame made of two tubular spaced apart side members 15 and 16 that are made of tubular material, and two end frame members 17 and 18 that are also made, preferably of tubular material and the ends of which are rigidly and permanently attached, preferably welded, to the side frame members 15 and 16 at points adjacent the ends of the frame members 15 and 16.

The device is further provided with a staging support bar 19. Between the bar 19 and the end frame member 17 and at the central portion thereof is a short tubular spacer member 20 that has a cap or closure element 21 for one end thereof and on which rests the staging support bar 19. One end of a bolt 22 is welded to the central portion of the staging support bar 19, and slidably passes through a hole in the cap element 21 and the bolt 22 continues on through the spacer tube 20 and through a hole in the central portion of the cross or end frame member 17, a nut 23 is threaded on the inner end of the bolt 22 to rigidly hold the staging support bar 19 in a position spaced a short way from the end frame member 17. The ends of the staging support bar 19 are bent slightly as shown at 24 to prevent the staging lines from slipping off of the ends of the staging support bar 19.

The device is further provided with a staging stretcher bar 25. The end portions of the tubular side frame members 15 and 16 have elongated slots 26 therein that oppose each other and through which the ends of the staging stretcher bar 25 pass to the interior of the side frame tubes 15 and 16. In each tube 15 and 16 is a helical tension spring 27 that has eyes 28 and 29 formed one on each end thereof. The ends of the staging stretcher bar 25 are positioned one in each eye 29 of each spring 27 in the tubular side frame members 15 and 16. The springs 27 extend from the staging stretcher bar 25 in a direction toward the cross or end frame member 18 and two pins 30 pass one through each tubular side frame members 15 and 16 and the spring eye 28 of the springs 27 that are one in each tubular side frame member 15 and 16, the springs 27 being stretched or tensioned to move and yieldably hold the staging stretcher bar in the slots 26 in its closest relative position to the cross or end frame member 18.

Each tubular side frame element 15 and 16 is provided with a latch bar 31, one end of which is pivotally attached or mounted at 32 on its respective side frame member 15 or 16. The other end of each latch bar 31 is provided with a latch or hook formation that is swingable over one end of the slot 26 and is adapted to hook over and receive the end portions of the staging stretcher bar 25 and hold the staging stretcher bar in its retracted position in the slot 26 and against the pull or tension of the spring 27. The hook end of the latch bar 31 is also provided with a thumb piece 34 by which the latch bar 31 may be swung to and from engagement with the staging stretcher bar 25.

Figure 7:
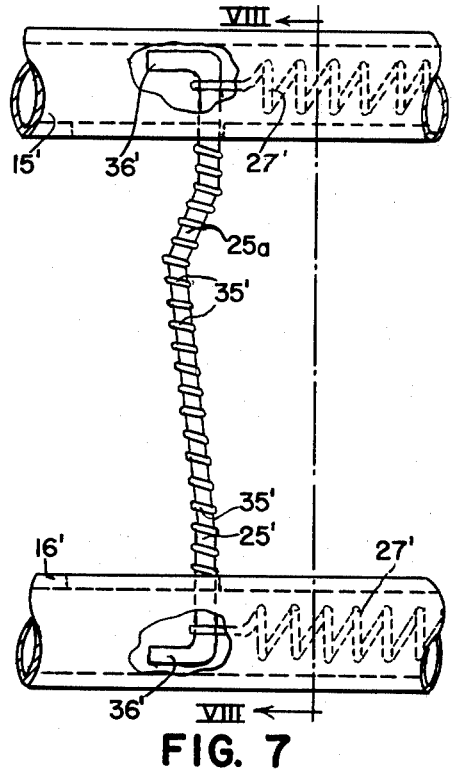
Fig. 7 is an enlarged detail front view of a modified form of the holder frame and staging holder bar.
Figure 8:
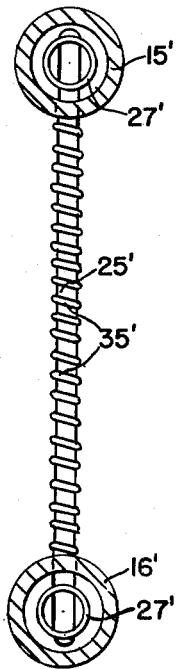
Fig. 8 is a transverse sectional view through the device on the line VIII—VIII in Fig. 7 and looking in the direction of the arrows.

In Figures 7 and 8 is shown a modified form of the staging stretcher bar. In these figures the staging stretcher bar is shown as having a curve 25a therein to accommodate variable length stagings that may be placed thereon and the staging stretched bar 25' has a wire or helical spring 35' wound or positioned therearound so that fish hooks of the staging may be placed between the turns of the spring 35' as a means of holding the fish hooks in uniformly spaced relative positions on the staging stretcher bar 25'. Because of the curve 25a in the staging stretcher bar 25' the staging stretcher bar 25' may want to revolve or turn a part of a turn when the stagings are placed on the device and the staging stretcher bar is released so that the springs 27' exert their pull on the staging stretcher bar 25', therefore the ends of the staging stretcher bar are bent or turned substantially ninety degrees as shown at 36' so that their position in their respective tubular side frame members 15' and 16' will prevent the turning of the staging stretcher bar 25'.

Figure 9:
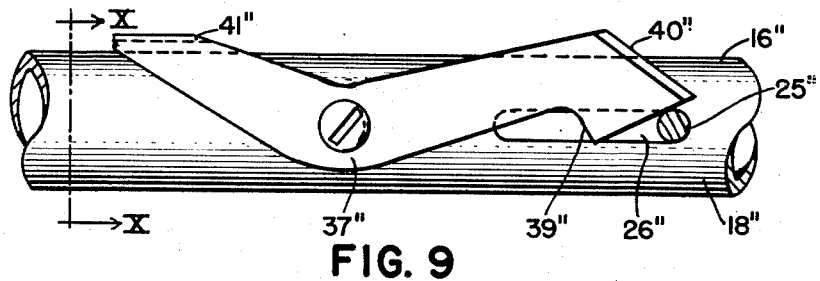
Fig. 9 is an enlarged detail side view of a modified form of the locking means for the staging holder bar.
Figure 10:
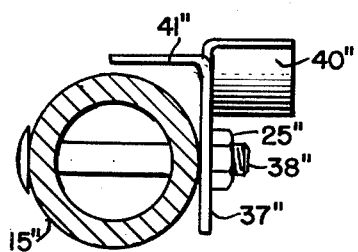
Fig. 10 is a detail sectional view through a portion of the device on the line X—X in Fig. 9 and looking in the direction of the arrows.

In Figures 9 and 10 is shown a modified form of the latch bar. In these figures the latch bar 37" is shown as being in the form of a cantilever that is pivotally mounted at 38" on its respective tubular side frame member 15" or 16", there being two of these cantilever latch bars, one on each frame member 15" and 16", the same as the latch bars 31. The outer end of one leg of each latch bar 37" has a hook formation 39" therein that is rockable over one end of the slot 26" to engage and disengage the staging structure bar, the same as previously described for the latch bar 31. Adjacent the hook 39" and on the latch bar 37″ is an inwardly turned thumb piece 40″ by which the bar 37″ may be pressed to the position in which the hook 39″ hooks over and engages the staging stretcher bar to hold it in its retracted position against the pull or tension of the springs 27. The other end of the latch bar 37″ is provided with an outwardly turned thumb piece 41″ which may be pressed to engagement with its respective side frame member 15″ or 16″ whereby the bar will be rocked to position such that the hook 39″ disengages the staging stretcher bar 25″ whereupon the springs 27″ act to pull and yieldably hold the staging stretcher bar in a position adjacent the end of the slot 26″ next to the cross or end frame member 18″, the same as previously described.

The trot line holder device having been constructed as above described, it is now ready for use and may be used by first removing the staging, which consists of the fish hooks 42 and their short staging lines 43 and their attachment loops 44, from the main line 45. This having been done, the staging stretcher bar 25 is moved toward the latch bar 31 to such a point that the springs 27 are stretched and the hooks 33 or 39″ may then be hooked over the ends of the staging stretcher bar 25 to hold it in its retracted position against the pull or tension of the springs 27.

The holder having thus been prepared the staging loops 44 are slipped one at a time over either selected end 24 of and onto the staging support bar 19 whereupon the fish hooks 42 may be hooked over the staging stretcher bar 25, whereupon the latch plates 31 or 37″, as the case may be, may be rocked from engagement with the staging stretcher bar 25 at which time the springs 27 will pull and move the staging stretcher bar 25 to pull and yieldably stretch and hold the stagings 42—43—44 in a tight and stretched position for drying and storing. The stagings having been taken care of as just described, the main line 45 of the trot line would then be evenly and tightly wound over and around the end frame members 17 and 18 to dry for storage.

While the device as shown and described is probably the preferred form of the device, it is to be understood that such modifications of the device may be employed as lie within the scope of the appended claims without departing from the spirit and intention of the invention. Now having fully shown and described my invention, what I claim is:

1. In a trot line holder of the kind described, a frame including two spaced apart tubular side frame elements and two spaced apart tubular end frame elements, the ends of said tubular elements being rigidly attached to the adjacent frame elements to form a rigid rectangular frame, a staging support bar rigidly carried by one of said tubular end frame elements in spaced relation thereto and being supported at its center, a staging stretcher bar, the opposing side frame elements each having a guide slot therein and the corresponding end of the staging stretcher bar being slidably supported therein, and spring means in each of said tubular side frame elements, each of said spring means being attached at one end to the corresponding end of the staging stretcher bar and the other end of said spring means being fixedly attached to the respective tubular side frame member to yieldingly support the staging stretcher bar in a spring tensioned position in said slots.

2. The trot line holder as defined in claim 1, in which the staging stretcher bar is curved to accommodate variable lengths of staging and includes means for positioning fish hooks thereon.

3. The trot line holder as defined in claim 1, in which the side frame members include means for receiving and holding the staging stretcher bar in retracted position against the tension of said spring means.

References Cited in the file of this patent

UNITED STATES PATENTS

| | | |
|---|---|---|
| 1,369,873 | Altschuler | Mar. 1, 1921 |
| 1,408,745 | Keyworth | Mar. 7, 1922 |
| 1,451,256 | Gardner | Apr. 10, 1923 |
| 1,489,471 | Tilton | Apr. 8, 1924 |
| 2,130,112 | Woolen | Sept. 13, 1938 |